United States Patent
Gu et al.

(10) Patent No.: US 10,809,749 B2
(45) Date of Patent: Oct. 20, 2020

(54) TEMPERATURE CONTROLLER

(71) Applicant: JIANGYIN HUILONG ELECTRIC HEATING APPLIANCE CO., LTD., Jiangsu (CN)

(72) Inventors: Youfan Gu, Jiangsu (CN); Long Xie, Jiangsu (CN)

(73) Assignee: Jiangyin Huilong Electric Heating Appliance Co., Ltd., Jiangsu (CN)

( * ) Notice: Subject to any disclaimer, the term of this patent is extended or adjusted under 35 U.S.C. 154(b) by 138 days.

(21) Appl. No.: 16/065,690

(22) PCT Filed: Dec. 20, 2016

(86) PCT No.: PCT/CN2016/110951
§ 371 (c)(1),
(2) Date: Jun. 22, 2018

(87) PCT Pub. No.: WO2017/107891
PCT Pub. Date: Jun. 29, 2017

(65) Prior Publication Data
US 2018/0373277 A1    Dec. 27, 2018

(30) Foreign Application Priority Data
Dec. 22, 2015    (CN) .......................... 2015 1 0976880

(51) Int. Cl.
*H05B 1/02*    (2006.01)
*G05D 23/19*    (2006.01)
(Continued)

(52) U.S. Cl.
CPC ......... *G05D 23/1919* (2013.01); *G05D 23/22* (2013.01); *G05D 23/2401* (2013.01); *H05B 1/0233* (2013.01)

(58) Field of Classification Search
CPC ...... H05B 1/0233; H05B 3/0047; H05B 1/02; G05D 23/1919; G05D 23/22; G05D 23/2401
(Continued)

(56) References Cited

U.S. PATENT DOCUMENTS 4,677,282 A * 6/1987 Walsh ................ G05D 23/1909
219/494
5,347,104 A * 9/1994 Morishima ............. F24C 7/087
219/457.1
(Continued)

FOREIGN PATENT DOCUMENTS

CN            2258677 Y        7/1997
CN          201402417 Y        2/2010
(Continued)

*Primary Examiner* — Mark H Paschall
(74) *Attorney, Agent, or Firm* — Muncy, Geissler, Olds & Lowe, P.C.

(57) ABSTRACT

A temperature controller includes a microprocessor, a temperature detector, a current detector, a control relay and an external interface. Wherein, the temperature detector detects a working temperature of a heater; the current detector detects a current value passing through a heating element; and the microprocessor determines an operating state of the temperature controller (102) according to a temperature and a current value received from the temperature detector and the current detector, and sends a control signal to the control replay, thereby controlling the operation of the heater so as to adjust the temperature. By means of the temperature controller, current measurement is added while temperature measurement is performed, so that an operating state of a heater can be correctly determined, thereby greatly improving the reliability of the temperature controller.

14 Claims, 5 Drawing Sheets

(51) Int. Cl.
*G05D 23/22* (2006.01)
*G05D 23/24* (2006.01)

(58) Field of Classification Search
USPC ........ 219/494, 497, 501, 505, 210, 506, 502
See application file for complete search history.

(56) References Cited

U.S. PATENT DOCUMENTS

| | | | | |
|---|---|---|---|---|
| 6,043,461 | A * | 3/2000 | Holling | F24C 7/087 |
| | | | | 219/445.1 |
| 6,427,581 | B1 * | 8/2002 | Wu | A47J 37/0611 |
| | | | | 99/332 |
| 7,562,830 | B2 | 7/2009 | Orozco | |
| 7,932,480 | B2 * | 4/2011 | Gu | H05B 1/0244 |
| | | | | 219/482 |
| 2001/0020615 | A1 * | 9/2001 | Bradenbaugh | F24H 9/2007 |
| | | | | 219/497 |
| 2003/0127452 | A1 * | 7/2003 | Gerhardinger | A47F 3/0434 |
| | | | | 219/497 |
| 2007/0125764 | A1 * | 6/2007 | Knoeppel | F24H 9/2021 |
| | | | | 219/497 |
| 2013/0126516 | A1 * | 5/2013 | Potter | F24H 9/2028 |
| | | | | 219/494 |

FOREIGN PATENT DOCUMENTS

| | | |
|---|---|---|
| CN | 201876745 U | 6/2011 |
| CN | 202135341 U | 2/2012 |
| CN | 203520185 U | 4/2014 |
| CN | 105158548 A | 12/2015 |
| CN | 105468051 A | 4/2016 |
| CN | 105589382 A | 5/2016 |

* cited by examiner

TEMPERATURE CONTROLLER

BACKGROUND OF THE INVENTION

Technical Field

The present invention is involved in the field of industrial temperature control, specifically a kind of heater alarm and control module.

Technical Background

Heating is widely applied in the field of industry. Since heating requires massive energy, suitable and reliable temperature control is necessary to avoid the occurrence of overheating causing damage to equipment and serious potential safety hazards such as fire, etc.

A temperature detector is used as the only feedback signal (including thermocouple and thermal resistance, etc.) for traditional temperature control, which is a passive method of temperature control. If the temperature detector or relay breaks down, temperature control will fail. For example, if the thermocouple is short-circuited at the measuring point when the temperature is under the setting temperature, overheating of the heater will be caused. Even though extra safety equipment, such as thermal fuse, is used, the heater's operation under high temperature may cause serious wear and tear of the heater. Take heating of a semiconductor downstream line as another example, the high-temperature gas from reaction chamber may heat the whole heating pipeline, especially when gas flow is extremely high. When a traditional temperature control method is used, temperature feedback purely relies on the temperature detector and such high temperature may cause error alarms, which will affect the technical process.

Generally, a single heater is used for the purpose of reaching a high temperature. Therefore, single temperature control is enough. However, in the semiconductor industry, heating for longer pump lines is frequently required, and uniform and reliable temperature control must be guaranteed. In addition, the heater must be easily installed and dismantled since the heating pipelines typically require preventive maintenance. Therefore, multiple temperature controllers must be adopted to satisfy the requirements. A low-cost and reliable temperature controller is necessary. In addition, heating pipelines are usually very long, making energy consumption a serious problem. Besides, the requirements of heating temperature depend on the technical process. Thus, a flexible and convenient method for changing of the setting temperature and the power control is critical for heating of semiconductor process lines.

In addition, under the working conditions of heating for long pipeline (such as heating of a semiconductor process line), simultaneous application of multiple temperature controllers is required (which can sometimes reach dozens of controllers.) Usually, temperature alarm and monitoring is utilized for the whole process pipeline rather than for a single the temperature controller. On this basis, a temperature controller, corresponding heater alarm and control module must be involved to detect the working conditions of the whole heating pipeline and to control multiple heaters.

Current alarm devices have a relatively single function. The alarm relays in the series temperature controller can only provide low-temperature alarms and display the normal working status. In addition, multi-point communication protocols (such as RS485, Ethernet and EtherCAT) can be used for control of a single temperature controller. However, every controller must contain communication hardware, which leads to cost increases and volume enlargement of the temperature controller. In addition to this, every temperature controller must also be equipped with a corresponding address, which makes installation of the heater and temperature settings very complicated.

SUMMARY OF THE INVENTION

In order to solve the foregoing problem, the present invention provides a temperature controller, including a microprocessor, a temperature detector, a current detector, a control relay and an external interface. The temperature detector is used to detect the working temperature of the heater; the current detector is used to detect a current value passing through heating element; the microprocessor will determine the working conditions of the temperature controller according to the temperature and current value received from the temperature detector and the current detector, and send the control signal to the control relay to control the working conditions of the heater to regulate the temperature.

In addition, the temperature controller of this invention includes a safety relay which will control the control relay to cut off power supply for heater when the microprocessor determines that the working conditions of the temperature controller are abnormal.

What's more important is that external interface of the microprocessor is connected with an optically coupled solid-state relay and an optocoupler. The optically coupled solid-state relay is used to provide an alarm signal. The optocoupler is used for remote control of the temperature controller.

Specifically, the optically coupled solid-state relay includes a light-emitting diode and a power switch. The optocoupler includes a light-emitting diode and a phototriode. One end of the power switch of the optically coupled solid-state relay is connected with the positive electrode of the light-emitting diode of the optocoupler. The connected end constitutes the input end of the heater temperature controller. The other end of the power switch of the optically coupled solid-state relay becomes the first output end of the heater temperature controller. The negative electrode of the light-emitting diode of the optocoupler becomes the second output end of the heater temperature controller. The positive electrode of the light-emitting diode of the optically coupled solid-state relay is connected to the DC power supply while its negative electrode is connected to one of the I/O interfaces of the microprocessor. The collector electrode of the phototriode of the optocoupler is connected to the DC power supply. The emitting electrode is grounded and connected to the CCP and the analog signal input end of the microprocessor simultaneously.

It is important to note that the fore-mentioned DC power supply can be a 5V DC power supply.

In addition, the control relay is connected with solid-state bidirectional thyristor in series.

Preferentially, the microprocessor possesses the function of zero voltage detection.

The temperature controller of the present invention can carry out temperature measurement and current measurement simultaneously, which will correctly judge the working conditions of the heaters and will greatly improve reliability of the temperature controller.

DESCRIPTION OF THE PREFERRED EMBODIMENTS

Figure 1:
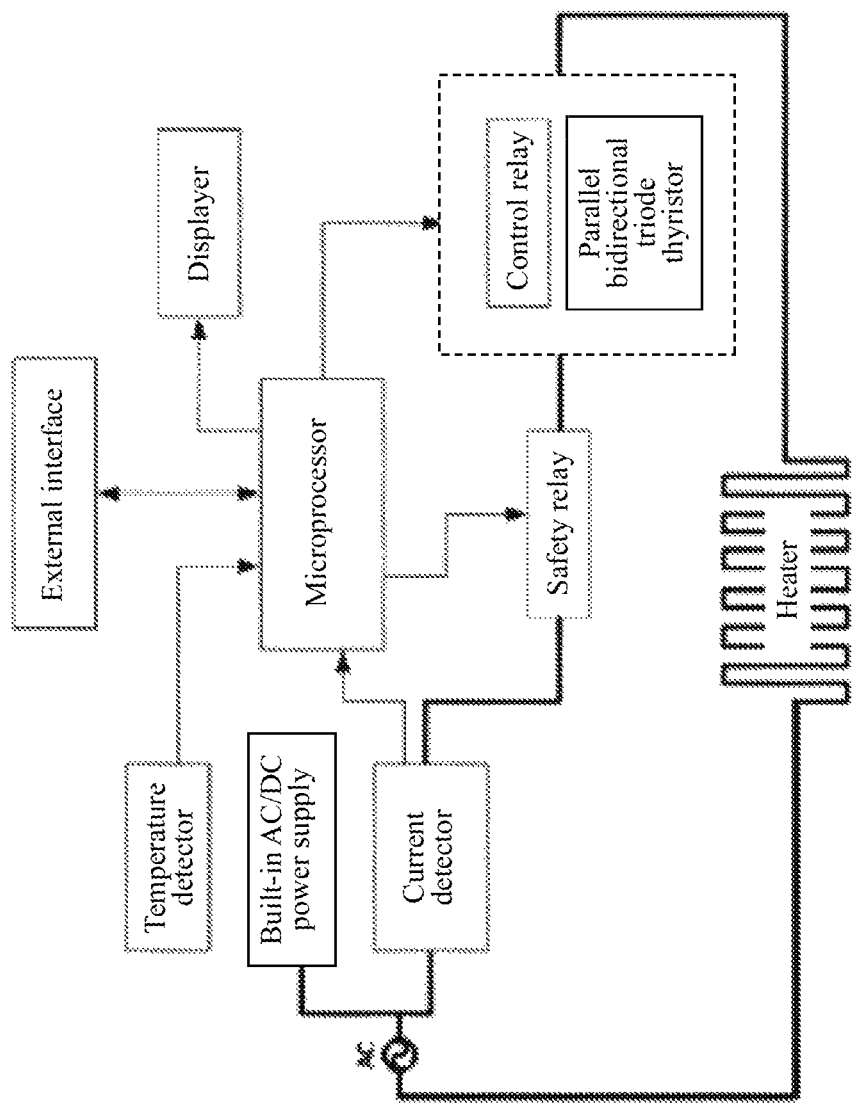
FIG. 1 is the block diagram of the temperature controller of the present invention.

As shown in FIG. 1, the temperature controller of the present invention includes a microprocessor, a temperature detector, a current detector, a safety relay, a control relay and an external interface. The temperature detector is used to detect the working temperature of the heater; the current detector is used to detect the current value passing through the heating element. The microprocessor will determine the working condition of the temperature controller according to the temperature and current values received from the temperature detector and current detector, and will send the control signal to the safety relay and control relay to control the working condition of the heater to regulate the temperature. The safety relay is used to cut off power supply to the heater when the microprocessor determines that the working conditions of the temperature controller are abnormal.

The external interface is connected to the optically coupled solid-state relay and the optocoupler. The optically coupled solid-state relay is used to provide the alarm signal. For example, when the heater reaches a set temperature value, the optically coupled solid-state relay will operate under a conductive state and send alarm information. When the heater temperature is lower than the set value, the optically coupled solid-state relay will operate under the state of open circuit. The optically coupled solid-state relay is controlled by the microprocessor. The optocoupler is used for remote control of the temperature controller, including switching of the control and working modes of the heater, modification of temperature set value. The working mode of optocoupler is controlled by the strength of the external signal. When the external signal is very weak and its power is insufficient to drive the optocoupler (such as the PWM signal sent by a microprocessor), the optocoupler will not operate. When the external signal is strong, the optocoupler will be driven and the LED in it will be lit to deliver the signal to microprocessor. This is used for temperature setting of the temperature controller, or determination of the working mode for the temperature controller.

Generally, a certain heating temperature is required for pipeline heating. However, for the sake of energy conservation or process, the heater temperature can be properly lowered under certain conditions, or even can be closed. The temperature controller of this invention can preset two different temperatures and carry out rapid switching of working modes (temperatures) for the heater.

To sum up, the temperature control of the present invention can work independently without an external control signal (temperature control). In addition, it can carry out a low temperature/high temperature alarm according to an external connection and enter two different working modes, or carry out the setting operation of the temperature set value for the temperature controller.

In the temperature control of the present invention, the temperature detector is used to detect the working temperature of the heater. The current detector is used to detect the current value of the heating element to determine the operational condition of the heater. Under normal working conditions, when the heater is powered on, the current will be over zero, when heater is closed and cooled, the current will be zero. Through combination of measurement of current and temperature, working conditions of the heater can be accurately determined.

When the current value is over zero but the space temperature of heater is not increasing, it can be determined that the thermocouple has failed. When the current value is over zero but the measured temperature is decreasing, it can be determined that the thermocouple is connected inversely. In these conditions, the heater has to be closed immediately and alarm information will be sent; otherwise, the temperature will keep rising until the thermal fuse has melted. In addition, if the temperature is increasing but the current is zero, it means that gas is heated reversely towards the heating jacket along the pipeline. In this condition, although an alarm of excessive temperature can be sent, it is unnecessary to stop the whole process so that unnecessary downtime loss can be avoided.

An electric arc will be generated when a high-voltage mechanical relay is operated. The heat generated by such a high-voltage arc can melt and oxidize any contactors, which will greatly affect the working life of the mechanical relay. Under conditions of maximum rated operating current, service time of an ordinary mechanical relay is only 0.1 million times, which is far from adequate for temperature control. However, if a solid-state bidirectional triode thyristor relay is used, massive heat will be generated under the working conditions of heavy current due to high internal resistance, which requires a large radiator and will reduce the reliability of the elements. Therefore, as shown in FIG. 1, the control relay of temperature controller of this invention is connected with a solid-state bidirectional triode thyristor in series to eliminate the electric arc generated during operation of the mechanical relay to improve the service time of the mechanical relay. The solid-state bidirectional triode thyristor shall be conducted before operation of mechanical relay, which will greatly reduce the voltage of the contactor of the mechanical relay (<1V) to avoid the electric arc generated during operation of high-voltage mechanical relay. The application of this no-arc relay will promote its working life by hundred times.

In order to reduce electrical noise and further improve reliability of the bidirectional triode thyristor, the microprocessor with the function of no-voltage detection is adopted in this invention so that alternating current of on-off of switch of bidirectional triode thyristor is at a near zero voltage.

Figure 2:
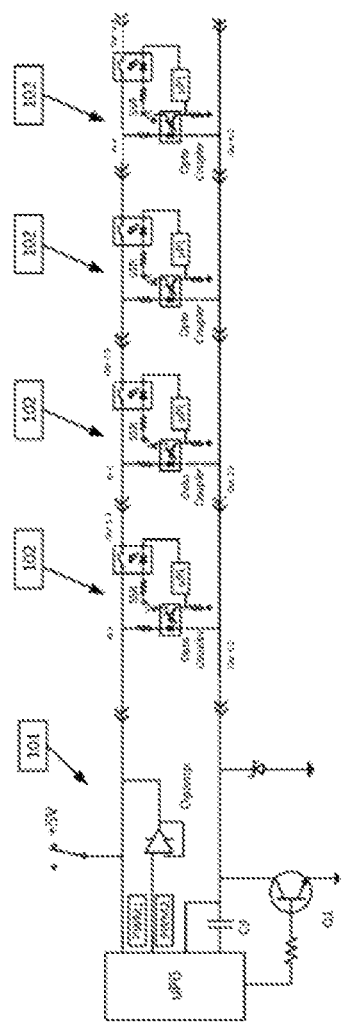
FIG. 2 is the circuit diagram of the heater alarm and control module with multiple the temperature controllers shown in FIG. 1.

As shown in FIG. 2, heater alarm and control module is further illustrated, including a main processor uP0 of the heater alarm and control module, the heater alarm and control circuit and the heater temperature control module. The heater temperature control module contains n heater temperature controllers 102 as shown in FIG. 1; the main processor uP0 of the heater alarm and control module is connected with the heater temperature control module through the heater alarm and control circuit.

Each heater temperature controller 102 in FIG. 2 only displays the components related to the alarm and is composed of the temperature controller shown in FIG. 1 with the same circuit structure which mainly includes one optically coupled solid-state relay, one optocoupler and microprocessor uP1 (the microprocessor of temperature controller in FIG. 1). However, the components for the heater control are ignored. Refer to FIG. 1.

The optically coupled solid-state relay SSR includes a light-emitting diode and a power switch; it controls switching of the power switch according to the existence of the signal input in the light-emitting diode. The optocoupler includes a light-emitting diode and a phototriode, and it controls the break-over and cut-off of the phototriode according to the existence of a signal input in the light-emitting diode.

One end of the power switch of the optically coupled solid-state relay SSR is connected with the positive electrode of the light-emitting diode of the optocoupler. The connection end constitutes the input end (Inn in FIG. 2) of the heater temperature controller 102, and the other end of the power switch of the optically coupled solid-state relay SSR becomes the first output end (Out n-1 in FIG. 2) of the heater temperature controller 102. The negative electrode of the light-emitting diode of the optocoupler becomes the second output end (Out n-2 in FIG. 2) of the heater temperature controller 102. The positive electrode of the light-emitting diode of the optically coupled solid-state relay SSR is connected to 5V DC power supply while its negative electrode is connected to one of the I/O interfaces of microprocessor uP1. The optically coupled solid-state relay SSR is controlled by microprocessor uP1 through the I/O interface.

The collector electrode of the phototriode of the optocoupler is connected to 5V DC power supply; the emitting electrode is grounded and connected to CCP (capture, compare, and PWM) of microprocessor uP1 and the analog signal input end simultaneously. The optocoupler is controlled through output of the heater alarm and control module. The positive electrode of the built-in light-emitting diode of the optocoupler (the input end of heater temperature controller 102) is connected with the output end of the heater alarm and control module. If the input signal is a DC voltage, microprocessor uP1 is able to measure its voltage value; when the input signal is a pulse PWM signal, microprocessor uP1 can measure its frequency.

Figure 3:
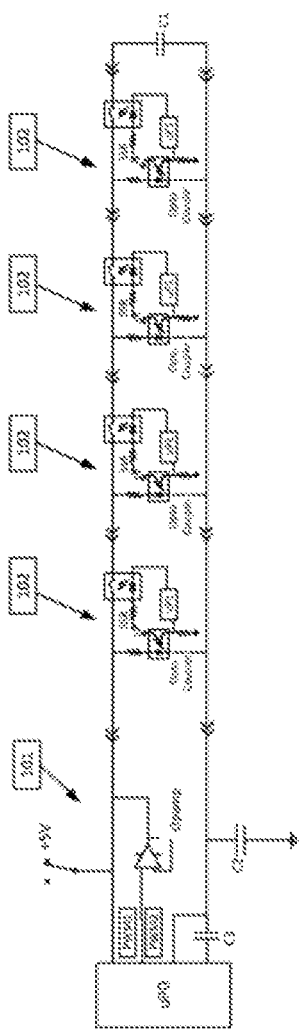
FIG. 3 is the equivalent circuit of the heater alarm and control module under normal alarm working conditions.
Figure 4:
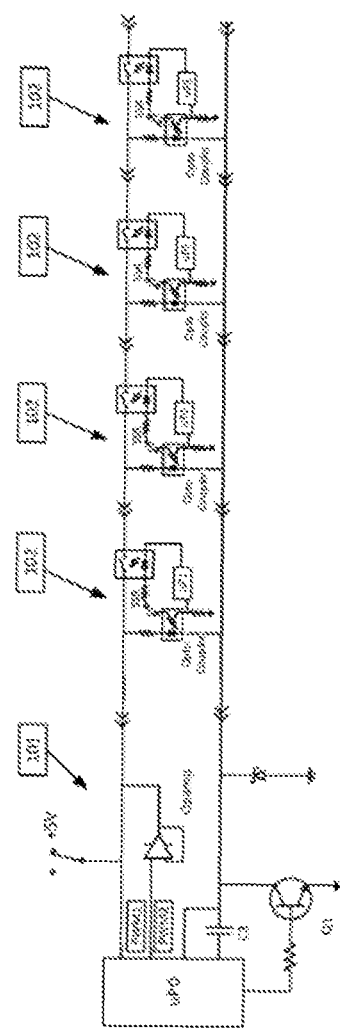
FIG. 4 is the equivalent circuit of the heater alarm and control module under the working conditions of temperature setting.
Figure 5:
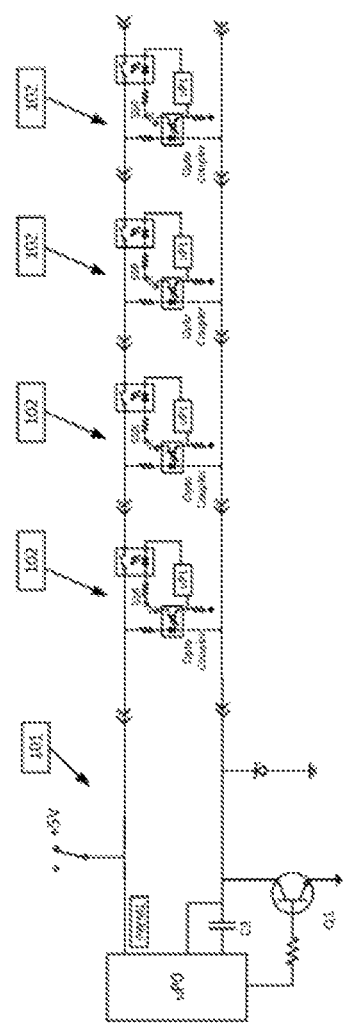
FIG. 5 is the equivalent circuit of the heater alarm and control module under the working conditions of sleep control/activation of the second temperature control by the heater.

The main processor uP0 of the heater alarm and control module is able to provide three different control signals for the heater temperature control module through the heater alarm and control circuit, i.e. (5V) DC, weak-power PWM1 signal and high-power PWM2 signal to be input into the input end of the first heater temperature controller 102. In which, the high-power PWM2 signal will be output to the input end of the first heater temperature controller 102 after power promotion through the buffer operational amplifier. The input end of the second heater temperature controller 102 is connected with the first output end of the first heater temperature controller 102; likewise, the input end of the latter heater temperature controller 102 is connected with the output end of the preceding heater temperature controller 102 sequentially, until the input end of the nth heater temperature controller 102 is connected with the output end of the (n−1)th heater temperature controller 102; the output end of the nth heater temperature controller 102 is connected to one end of terminal loop capacitor C1 (FIG. 3). The other end of the terminal loop capacitor C1 is connected with the second output end of n heater temperature controllers 102, and the end of terminal loop capacitor C1 connected with the second output end of n heater temperature controllers 102 is connected to the main processor uP0 of the heater alarm and control module.

Specifically, the second output end of n heater temperature controllers 102 is connected to the analog signal input end (AI) of the main processor uP0 of the heater alarm and control module to measure DC voltage. It is also connected to the CCP end of the main processor uP0 of the heater alarm and control module through the first capacitor C3 to measure frequency. The end of terminal loop capacitor C1 connected with the second output end of n heater temperature controllers 102 is grounded through AC dividing capacitor C2; meanwhile, it is connected with collector electrode of one triode Q1. The base electrode of the mentioned triode Q1 is connected with one I/O terminal of the main processor uP0 of the heater alarm and control module. The emitting electrode of triode Q1 is grounded. During an alarm, the triode Q1 is under the cut-off state; while it is conductive when it controls the temperature controller.

As described above, the main processor uP0 of the heater alarm and control module provides three different control signals for the heater temperature controller 102, i.e. (5V) DC, a weak-power PWM1 signal, and a high-power PWM2 signal. These signals are used for three working modes for temperature controller, i.e. a control mode (5VDC), an alarm mode (weak-power PWM1), or a temperature setting mode (high-power PWM2).

When the weak-power PWM1 signal (alarm mode) is input, this signal will be initially input into the input end of the first heater temperature controller 102. Since the PWM1 signal is very weak, the optocoupler in the temperature controller is under the state of an open circuit. Therefore, it is equivalent to the series circuit composed of the optically coupled solid-state relay SSR in n temperature controllers 102.

At this moment, the condition of the optically coupled solid-state relay SSR is controlled by microprocessor uP1. The action of SSR is completed by the built-in light-emitting diode. When the heater temperature is lower than the set value of the temperature controller, the I/O interface of microprocessor uP1 connecting the negative electrode of light-emitting diode of the optically coupled solid-state relay SSR will output high potential to make SSR under the state of an open circuit. When the heater temperature is within the control range of the temperature controller (near the set value; the specific range is preset), the I/O interface of microprocessor uP1 connecting the negative electrode of the light-emitting diode of the optically coupled solid-state relay SSR will output low potential to make SSR under the closed state. The optically coupled solid-state relay SSR in heater temperature controller 102 connected in series and terminal loop capacitor C1 constitute the loop of the alarm control circuit.

If the heater controlled by the first heater temperature controller 102 has entered the control range of the temperature controller, the internal optically coupled solid-state relay SSR will be under the closed state. At this moment, the alarm weak-power PWM1 input signal will be output from the first output end of the first heater temperature controller 102 and will enter the second heater temperature controller 102 through its input end successively, until the nth heater temperature controller 102. However, when the heater controlled by a certain heater temperature controller 102 is not within control range of temperature controller, the optically coupled solid-state relay SSR in this heater temperature controller 102 will be under the state of an open circuit. At this moment, the alarm of the weak-power PWM1 input signal will not be output from the first output end of the heater temperature controller 102. The weak-power PWM1 signal will not return to the main processor uP0 of the heater alarm and control module.

In such a case, only when all the n heater temperature controllers 102 along the pipeline enter the control range of the temperature controller, can the alarm of the weak-power PWM1 input signal be transferred to the nth heater temperature controller 102 from the first heater temperature controller 102, and can a closed AC loop be formed through terminal loop capacitor C1. The alarm weak-power PWM1 input signal sent by heater alarm and control module will be transferred back to the heater alarm and control module. Conversely, as long as one of the temperature controllers in n heater temperature controllers 102 along the pipeline is not within the control range of temperature controller, the alarm of the weak-power PWM1 input signal will not be transferred back to the main processor uP0 of the heater alarm and control module. Therefore, when the main processor uP0 of the heater alarm and control module is able to receive the alarm of the weak-power PWM1 sent by itself, it means that all the heaters along the pipeline have entered control range of temperature controller under normal working condition. Otherwise, it means that at least one heater is not within control range of temperature controller. At this moment, the heater alarm and control module will give alarm.

When the heater alarm and control module is merely used for an alarm, the terminal loop capacitor C1 can be replaced by a short-circuited circuit because both the capacitor and the ordinary cable are able to ensure openness of an AC loop. However, if a short-circuited circuit is adopted, the heater alarm and control module can't be used to switch working modes for heater temperature controller 102 and to modify the temperature set value of the heater temperature controller 102 (see details in the following description).

When the heater alarm and control module is about to carry out control operation for the heater temperature controller 102, a specific PWM1' signal different from the temperature alarm frequency shall be initially sent. When this signal reaches the input end of the first heater temperature controller 102, microprocessor uP1 in the first heater temperature controller 102 will detect the frequency of this signal through the optocoupler. If it is confirmed that the heater alarm and control module will send the controlled signal with a specific frequency, the uP1 processor in the heater temperature controller 102 will give the commands to compulsively close the optically coupled solid-state relay SSR, which will output the specific frequency PWM1' signal from the first output end of the first temperature controller 102 and transfer it to the input end of the second heater temperature controller 102. Likewise, the microprocessor in the latter heater temperature controller 102 will give the command to compulsively close the optically coupled solid-state relays SSR one by one, until the optically coupled solid-state relay SSR of n heater temperature controllers 102 are closed completely.

When the optically coupled solid-state relay SSR in all the heater temperature controllers 102 have compulsively closed, the heater alarm and control module will output a 5VDC voltage to judge if the terminal loop is short-circuited. If the terminal loop is under state of DC short circuit, the analog input (AI) of the heater alarm and control module will detect this 5V voltage. At this moment, the control operation for the heater temperature controller 102 will be stopped. Under such condition, when triode Q1 is closed, the whole loop will be under state of short circuit. If the circuit is connected, the loop current will be excessive; it will affect reliability of control circuit.

If the terminal loop is proved to be under state of an open circuit, or with loop capacitance, the analog input (AI) of the heater alarm and control module will not detect this 5V voltage. At this moment, the heater alarm and control module will close triode Q1 and start to release 5VDC or output the strong-power PWM2 signal after power promotion through the buffer operational amplifier, to control heater temperature controller 102. The microprocessor uP1 in all the temperature controllers along the pipeline will carry out the related operations according to the signal received.

FIG. 3 is an equivalent circuit of the normal alarm. Triode Q1 is under the state of an open circuit so it is ignored from the circuit diagram. The main processor uP0 of heater alarm and control module will send the weak-power PWM1 signal. If all the heaters have entered control range of temperature controller, the optically coupled solid-state relay of n heater temperature controllers 102 will be conducted. The optically coupled solid-state relay SSR in the temperature controller, the terminal capacitor C1 (0.1 uF), the AC dividing capacitor C2 (0.01 uF), and the capacitor C3 (0.1 uF) connected in series constitute a capacitive circuit The main processor uP0 of the heater alarm and control module can receive the PWM1 pulse representing normal operational condition of the heater to determine if all the heaters are under normal operation. If any of these relays are under the state of an open circuit, it means that at least one heater has not reached the set temperature for the heaters. Thus, the main processor uP0 of heater alarm and control module will give alarm.

If terminal capacitor C1 is not connected, the alarm function will fail. However, the function of modifying the temperature setting and the operational mode still works. If the terminal capacitor is short-circuited, the alarm function will still work but the function of modifying the temperature settings and the operational mode will not work (system self-protection).

The temperature setting of the heater temperature controller 102 is carried out according to the following steps:

1. Pre-order for the temperature control is sent to compulsively close the solid-state relay in the heater temperature controller 102.

A specific frequency PWM1' signal is sent by the main processor uP0 of the heater alarm and control module to the heater temperature controller 102 through PWM1 signal line of heater alarm and control module. When the microprocessor uP1 of heater temperature controller 102 detects this signal, it will give commands immediately to compulsively close solid-state relays SSR in the heater temperature controller 102 one by one.

2. Detect if the loop is DC short-circuited

5VDC voltage is sent to the heater temperature controller 102 when the triode Q1 is under the state of an open circuit. If the main processor uP0 of the temperature controller detects 5V voltage, it means the loop is DC short-circuited and control command will not be sent. If the detected voltage is lower than 5V, Q1 will be closed and the operation of temperature control will be continued.

3. Temperature setting

Temperature setting of the heater temperature controller 102 is realized by the high-power PWM2 signal sent by the main processor uP0 of the heater alarm and control module. Through the buffer operational amplifier, the power of PWM2 is promoted so PWM2 is able to drive all the optocouplers in heater temperature controller 102. Triode Q1 is conducted to ensure there is sufficient current to drive all the optocouplers (of which numbers can reach dozens).

When the microprocessor uP1 in the heater temperature controller 102 receives the pulse signal of PWM2, it will convert the detected PWM2 signal frequency to the temperature set value and save it in the chip.

4. Display of temperature

Due to the simultaneous modification of the temperature setting of the multiple heater temperature controllers 102, the tri-color LED is adopted in this invention to display the set temperature of the heater temperature controllers 102. For example, one flash of red light means 100° C.; one flash of green light means 10° C.; one flash of blue light means 1° C.; quick flashing means 0. Such kind of design can realize design of simplified circuit and is very intuitive.

This temperature setting method can set the temperature set value of the multiple heater temperature controllers 102 at the same time without requiring setting of the address of the heater temperature controller 102 and installation of communication chips, which will greatly reduce cost and is convenient for users.

In addition, the heater alarm and control module can carry out sleep control/activation of the second temperature, which is completed by 5V DC voltage provided by heater alarm and control module. At this moment, the terminal capacitor is under the state of an open circuit (DC voltage shall not be conducted through capacitor); therefore, it is ignored in equivalent circuit diagram. However, triode Q1 is conducted; all the optocouplers for control are activated and all the optically coupled solid-state relays are compulsively closed. The following figure is the equivalent circuit of sleep control/activation of the second temperature control of heater temperature controller.

Under such working conditions, one specific frequency PWM1' signal will be sent by PWM1 in alarm and control module 101 before 5V DC voltage is opened up to direct the microprocessor uP1 in the heater temperature controller 102 to compulsively close the solid-state relay SSR in the heater temperature controller 102. Whether the loop is DC short-circuited is detected by 5VDC voltage sent to the control circuit when triode Q1 is under the state of an open circuit. If the loop is DC short-circuited, alarm and control module 101 will detect 5V voltage. Under such conditions, the command of sleep control of the heater will not be implemented. If the loop is DC open-circuited, alarm and control module 101 will detect voltage lower than 5V. Under such conditions, the command of sleep control of heater will be sent. At this moment, the microprocessor in heater temperature controller 102 will detect a DC voltage which will trigger the second temperature control. If the second temperature set value is low enough, heater will enter a sleep state. The temperature value of the second temperature control is pre-saved in uP1. If 5V DC voltage is not detected, the normal temperature set value in the microprocessor of the temperature controller will be used; if 5V DC voltage is detected, the second temperature set value in the microprocessor of the temperature controller will be used for temperature control.

The foregoing illustration shows and describes the preferential example of this invention. It is understood that this invention is not only limited to the forms disclosed in this article and it shall not be regarded as the exclusion of other examples; instead, this invention can be used in other combinations, modification and environment; in addition, it can be modified through the foregoing instruction, or technology or knowledge of related fields within the scope of invention conception in this article. The modification and variation by the personnel in this field will not break away from the spirit and range of this invention and shall be within the protection scope of the attached claims of this invention.

What is claimed is:

1. A temperature controller, comprising a microprocessor, a temperature detector, a current detector, a control relay and an external interface; wherein, the temperature detector is configured to detect a working temperature of a heater; the current detector is configured to detect a current value passing through a heating element; the microprocessor is configured to determine a working condition of the temperature controller according to a temperature and a current value received from the temperature detector and the current detector, and send a control signal to the control relay to control a working condition of the heater to regulate the temperature, wherein the external interface of the microprocessor is connected with an optically coupled solid-state relay and an optocoupler, wherein the optically coupled solid-state relay is configured to provide an alarm signal, wherein the optocoupler is configured for remote control of the temperature controller, wherein the optically coupled solid-state relay comprises a light-emitting diode and a power switch, wherein the optocoupler includes a light-emitting diode and a phototriode, wherein one end of the power switch of the optically coupled solid-state relay is connected with a positive electrode of the light-emitting diode of the optocoupler, wherein the connected end constitutes an input end of the temperature controller, wherein another end of the power switch of the optically coupled solid-state relay constitutes a first output end of the temperature controller, wherein a negative electrode of the light-emitting diode of the optocoupler constitutes a second output end of the temperature controller, wherein a weak-power PWM signal and a high-power PWM signal are respectively provided to the input end of the temperature controller such that the temperature controller works in an alarm mode and a temperature setting mode respectively, and wherein the weak-power PWM signal is weak enough such that the optocoupler in the temperature controller is under a state of an open circuit and the solid-state relay is controlled by the microprocessor to provide the alarm signal; and the strong-power PWM signal is strong enough to drive the optocoupler in the temperature controller such that a signal frequency of the strong-power PWM signal is detected and converted into a temperature set value for the temperature controller.

2. The temperature controller of claim 1, wherein the control relay is connected with a solid-state bidirectional thyristor in series.

3. The temperature controller of claim 2, wherein the microprocessor possesses a function of zero voltage detection.

4. The temperature controller of claim 1, further comprising a safety relay configured to control the control relay to cut off a power supply for the heater when the microprocessor determines that the working condition of the temperature controller is abnormal.

5. The temperature controller of claim 4, wherein the control relay is connected with a solid-state bidirectional thyristor in series.

6. The temperature controller of claim 5, wherein the microprocessor possesses a function of zero voltage detection.

7. The temperature controller of claim 1, wherein the control relay is connected with a solid-state bidirectional thyristor in series.

8. The temperature controller of claim 7, wherein the microprocessor possesses a function of zero voltage detection.

9. The temperature controller of claim 1, wherein the positive electrode of the light-emitting diode of the optically coupled solid-state relay is connected to a DC power supply while the negative electrode is connected to one I/O interface of the microprocessor, wherein a collector electrode of the phototriode of the optocoupler is connected to the DC power supply, and;

wherein an emitting electrode is grounded and connected to a CCP and an analog signal input end of the microprocessor simultaneously.

10. The temperature controller of claim 9, wherein the control relay is connected with a solid-state bidirectional thyristor in series.

11. The temperature controller of claim 10, wherein the microprocessor possesses a function of zero voltage detection.

12. The temperature controller of claim 9, wherein the DC power supply is 5V.

13. The temperature controller of claim 12, wherein the control relay is connected with a solid-state bidirectional thyristor in series.

14. The temperature controller of claim 13, wherein the microprocessor possesses a function of zero voltage detection.

* * * * *